United States Patent [19]

Tanguy et al.

[11] Patent Number: 5,472,267
[45] Date of Patent: Dec. 5, 1995

[54] FLOW CONTROL VALVE AND PRESSURE REGULATOR FOR AN ANTI-LOCK BRAKING SYSTEM

[75] Inventors: Christian Tanguy, Frepillon, France; Jack R. Phipps, Bristol, Tenn.

[73] Assignee: AlliedSignal Inc., Morristown, N.J.

[21] Appl. No.: 305,537

[22] Filed: Sep. 14, 1994

Related U.S. Application Data

[63] Continuation-in-part of Ser. No. 165,049, Dec. 10, 1993, abandoned.

[51] Int. Cl.$^6$ ............................... B60T 8/32; B60T 13/16
[52] U.S. Cl. ..................... 303/116.2; 303/84.2; 303/900; 303/901; 303/DIG. 2
[58] Field of Search .............................. 303/116.1, 117.1, 303/10, 11, 114.1, 115.4, DIG. 2, DIG. 3, DIG. 4, 900, 901, 84.2

[56] References Cited

U.S. PATENT DOCUMENTS

| 4,050,748 | 9/1977 | Belart | 303/116.2 |
| 4,708,404 | 11/1987 | Seibert et al. | 303/114.1 |
| 4,750,788 | 6/1988 | Seibert et al. | 303/116.2 |
| 4,938,541 | 7/1990 | Shaw et al. | 303/116.2 |
| 5,046,788 | 9/1991 | Lindenman | 303/116.1 |

FOREIGN PATENT DOCUMENTS

| 3446063 | 6/1986 | Germany . | |
| 3505410 | 8/1986 | Germany . | |
| 3626679 | 2/1988 | Germany . | |
| 3743588 | 4/1988 | Germany . | |
| 3831426 | 6/1989 | Germany . | |
| 4003328 | 8/1991 | Germany | 303/116.2 |
| 2186042 | 8/1987 | United Kingdom . | |
| 2186647 | 8/1987 | United Kingdom . | |

*Primary Examiner*—Matthew C. Graham
*Attorney, Agent, or Firm*—Leo H. McCormick, Jr.; Larry J. Palguta

[57] ABSTRACT

A vehicle antilock braking system having an operator controlled master cylinder for developing a first source of pressurized fluid and a second source of pressurized hydraulic fluid for selectively supplying rebuild pressure after an antilock event to simultaneously provide for actuation of each wheel braking device. A solenoid operated first flow control valve for each wheel controls communication of either the first source or second source of pressurized hydraulic fluid to the braking device and the braking device to a low pressure return. A hydraulically operated second control valve has a first inlet port connected to receive the first source of hydraulic pressurized fluid and a second inlet connected to receive the second source of hydraulic fluid and an outlet port connected to the first flow control valve. A bypass pressure regulator responsive to the first source of pressurized fluid and the second source of pressurized fluid supplies pressurized hydraulic fluid from the second source to each of the hydraulically operated second control valve when the operator controlled master cylinder supplies the first pressurized hydraulic fluid to the braking device. The pressure of the second source is directly proportional to the pressure of the first source and when sufficient to overcome a resilient member in the second control valve is supplied to the first valve to independently operate braking device.

5 Claims, 3 Drawing Sheets

5,472,267

FLOW CONTROL VALVE AND PRESSURE REGULATOR FOR AN ANTI-LOCK BRAKING SYSTEM

This patent application is a continuation-in-part of Ser. No. 08/165,049 filed Dec. 10, 1993, now abandoned.

BACKGROUND OF THE INVENTION

The present invention relates generally to vehicular braking systems and more particularly to a flow control valve and pressure regulator for limiting the communication of pressurized fluid from a pump to a vehicle braking system having anti-skid or anti-lock features.

Automobile drivers accustomed to driving under snowy or icy conditions are familiar with the technique of "pumping" the brake pedal so as to cyclically increase and decrease the braking force exerted on the wheels in order that a slipping wheel having a tendency to lock is permitted to re-accelerate back to a speed corresponding to the speed of the vehicle. Such a driver induced anti-skid technique is simulated by many known devices into anti-lock braking systems.

Some anti-lock braking systems operate on a so-called pump-back principle where the same hydraulic fluid is resupplied to the brake pad actuators subsequent to an anti-skid event while others operate of a replenish principle where the reapply or build fluid comes from a separate source such as a hydraulic accumulator.

U.S. Pat. No. 4,218,100 discloses an anti-lock braking system having an anti-skid valve between an operator-controlled pressure source and a brake actuator. In this system, the fluid connection between the source and actuator is interrupted and fluid is directed from the actuator to a low pressure reservoir when a skid is detected. There is a second source of pressurized fluid and a pressure responsive valve which opens to replenish the fluid supply to the actuator when the pressure difference between the operator-controlled pressure source and the brake actuator exceeds a predetermined value. U.S. Pat. No. 4,750,788 discloses a modulation valve for use in a traction control system to selectively control the communication of pressurized fluid to effect a brake application during acceleration of a vehicle to synchronize the application of torque to drive wheels.

U.S. Pat. No. 5,354,123 filed Nov. 5, 1992, discloses a braking system having a flow control valve which interconnects a pressure source, a low pressure return, and a braking device for directing fluid from the source to the braking device when in a first state and for directing fluid from the braking device to the return when in a second state. A spring-loaded accumulator receives and stores pressurized hydraulic fluid, and a fixed size fluid passing aperture selectively provides a limited flow of hydraulic fluid from the accumulator to the hydraulically actuated wheel rotation braking device to rebuild the braking force after a skid has been detected and corrected for. Unfortunately, this system requires numerous check valves in addition to the accumulators.

In low-cost electrohydraulic braking systems, it is difficult to restrict the reapply rate after an antilock event since normal braking is done through the same valve members. U.S. Pat. No. 5,046,788 discloses a quick release valve for use in a brake system to switch from an anti lock function in a brake system to a normal braking application.

It is desirable to provide a simple, quiet replenishment type system having no accumulators and lacking the typical numerous check valves associated with prior devices where appropriate control of the reapply rate can be achieved.

SUMMARY OF THE INVENTION

The present invention, which is included in a vehicle antilock braking system of the type having a hydraulically actuated wheel rotation braking device for each wheel, has an operator controlled master cylinder source of pressurized hydraulic fluid for actuating each of the braking devices, a two position flow control valve for each wheel in circuit between the source and the braking device for selectively directing fluid from the source to the braking device to brake the vehicle, or from the braking device to relieve braking force, and a second source of pressurized hydraulic fluid for supplying hydraulic fluid to the braking device subsequent to the flow control valve having directed fluid from the braking device to rebuild braking force. A bypass pressure regulator common to all the wheels responds to the operator controlled source of pressurized fluid and a second source pressures to supply pressurized hydraulic fluid from the second source to each of the pressure actuated valves only when the operator controlled source is supplying pressurized hydraulic fluid. The bypass pressure regulator supplies rebuild fluid at a pressure which is directly proportional to the pressure of the operator controlled source fluid.

In general the present invention provides an improvement for an otherwise relatively conventional combined brake and anti-skid system of the type having an operator controlled master cylinder, a hydraulically actuated wheel rotation braking device, a low pressure hydraulic fluid return, and a rebuild pressure source. The improvement includes a first solenoid actuated two position flow control valve in circuit with the low pressure return and the braking device for selectively directing fluid from an operator controlled source to the braking device and from the braking device to the return. There is a second hydraulic pressure actuated dual inlet, single outlet two position flow control valve in circuit between the source and the first flow control valve. A fixed size fluid passing aperture selectively provides a limited flow of hydraulic fluid from the rebuild pressure source to the wheel rotation braking device serially through the first and second flow control valves by way of the fixed aperture after the first flow control valve has directed fluid from the braking device to the return, to thereby rebuild braking force. In one position, the first flow control valve is effective to direct fluid from either the operator controlled source or the rebuild pressure source to the braking device to brake the vehicle, and in another position to direct fluid from the braking device to relieve braking force and also to block fluid flow from either the operator controlled source or from the rebuild pressure source to the braking device.

BRIEF DESCRIPTION OF THE DRAWING

Corresponding reference characters indicate corresponding parts throughout the several views of the drawing.

DESCRIPTION OF THE PREFERRED EMBODIMENT

Figure 1:
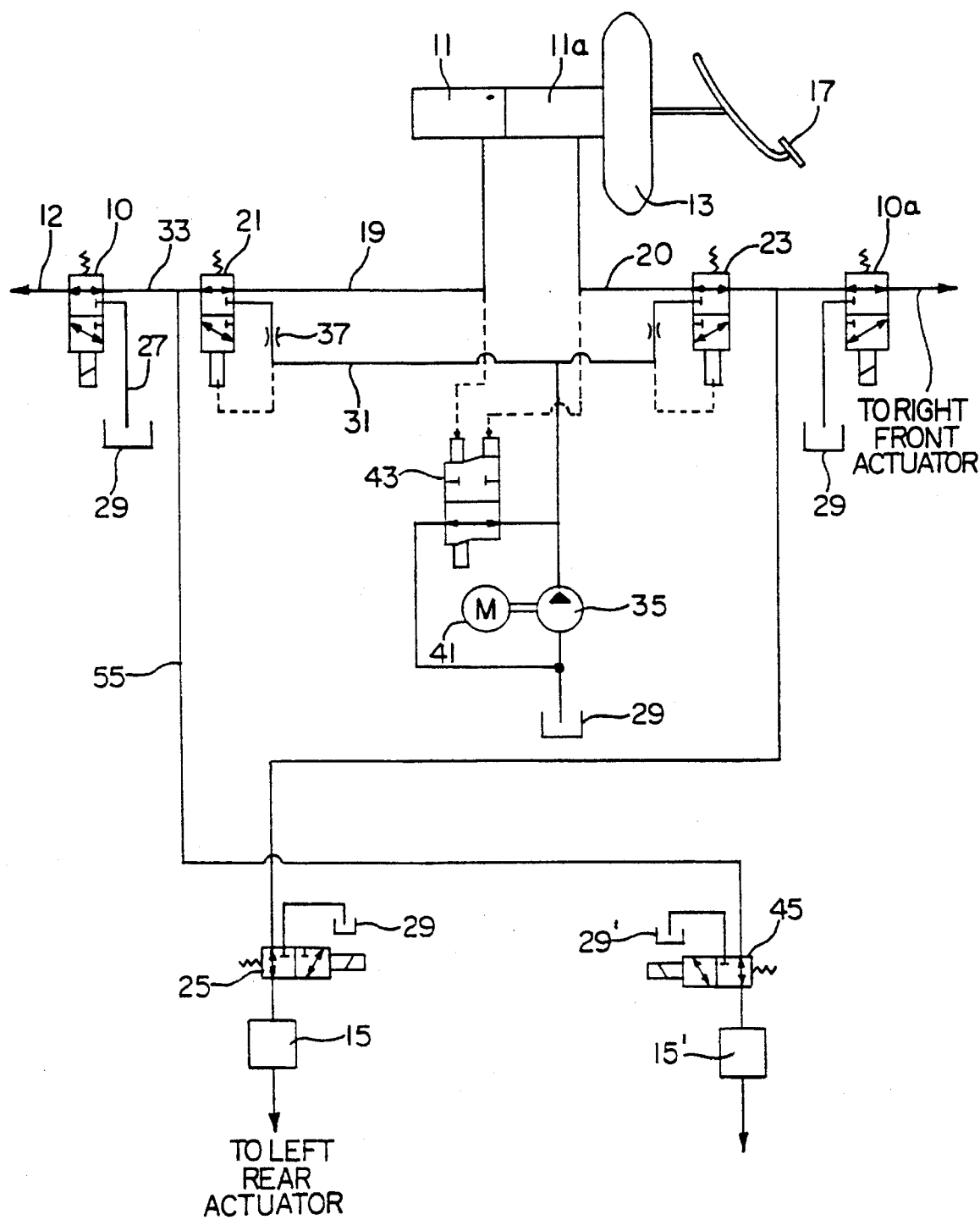
FIG. 1 is a schematic representation of an overall brake and anti-skid control system illustrating the present invention in one form.

FIG. 1 is a schematic illustration of an antilock braking system for a passenger car or similar vehicle. The system has a solenoid actuated anti-skid valve 10, of the general type disclosed in U.S. Pat. No. 5,174,336, located between an operator-controlled pressure source 11 and a brake actuator coupled to line 12. Typically, the pressure source is a conventional master cylinder having two separate chambers, one 11 for the left front/right rear vehicle wheel brakes, and the other 11a for the right front/left rear vehicle wheel brakes. The operator controlled source typically includes a vacuum booster 13. There are conventional proportioning valves such as 15,15' which are present to reduce the likelihood of rear wheel skid by applying a only a portion of the line pressure to the rear wheel brake cylinders when the hydraulic pressure is above some predetermined threshold.

When the driver wishes to slow the vehicle, the pedal 17 is depressed and hydraulic fluid pressure is transmitted from chambers 11,11a of the master cylinder by way of conduits (brake lines) 19 and 20 to a pair of pressure actuated valves 21 and 23. Valves 21 and 23 are normally in the position shown and deliver the pressurized fluid to four individual solenoid actuated anti-skid wheel valves such as 10 and 25. The anti-skid wheel valves 10 and 25 are normally in the position shown and transmit the fluid pressure to the wheel brakes to slow the vehicle. In the event that a conventional electronic control unit (not shown) detects a sufficient difference between wheel speed and vehicle speed to indicate a skid, a signal is sent to actuate four solenoids, each associated with a corresponding wheel valve such as 10 or 25, which actuates the corresponding anti-skid valve to shut off the hydraulic fluid path from chambers 11 of the master cylinder to the wheel cylinder, and to establish instead a bleed path from the wheel cylinder by way of conduits such as 12 and 27 to a common low pressure reservoir such as the sump 29. At a time when wheel speed gets sufficiently close to the vehicle speed, the solenoid is de-energized and the antilock valve 10 or 25 resumes its condition where the conduit 12 is connected to valve 21. However, during the time fluid is being bled from the brake actuator, the valve 21 has actuated to connect conduits 31 and 33 so that rebuild pressure is supplied through the fixed orifice 37 from pump 35 to the individual wheel cylinders. The pump 35 and its associated driving motor 41 are energized when a skid is first detected and functions not only as a pressure source means for supplying fluid during rebuild, but also to actuate the valves 21 and 23 preparatory to rebuild. A pressure regulating valve 43 bypasses the output of positive displacement pump 35 back to the sump 29 unless it is actuated by commanded brake pressure from chamber 11 of the master cylinder. This pressure regulator, which is common to the systems of FIGS. 1 and 2, will be described later in detail in conjunction with FIG. 3.

Thus, the solenoid valve 10 is effective in the position shown to direct fluid from either chamber 11 of the operator controlled master cylinder or the second rebuild pressure source 35 to the braking device to brake the vehicle, and in its other position to direct fluid from the braking device to relieve braking force and also to block fluid flow from either chamber 11 of the operator controlled master cylinder or from the second source 35 to the braking device. Similarly, flow control valve 10a is a solenoid actuated two position valve effective in one position to direct fluid from either chamber 11a of the operator controlled master cylinder or the second source 35 to the braking device to brake the vehicle, and in another position to direct fluid from the braking device to the sump 29 to relieve braking force. Also, valve 10a will block fluid flow from either chamber 11a of the operator controlled master chamber or from the second source 35 to the braking device when in its second position. The hydraulic pressure actuated valve 21 supplies rebuild fluid to the hydraulically actuated wheel rotation braking device by way of the solenoid valve 10 to rebuild the braking force after a skid has been detected and corrected for, that is, subsequent to the flow control valve 10 having directed fluid from the braking device to the return 27.

The system of FIG. 1 represents a minimum cost two orifice system. For example, orifice 37 and valve 21 are shared by the left front actuator and its valve 10, and right rear actuator and its valve 45. Similarly, the pressure actuated valve 23 is shared by two of the wheels and is effective in the position shown to pass hydraulic fluid from chamber 11a of the operator controlled master to the corresponding flow control valves 10a and 25 for selectively simultaneously actuating the right front and left rear braking devices. In its second position, valve 23 blocks the passage of hydraulic fluid from the operator controlled source 11a to the corresponding flow control valves 10a and 25, and provides instead a hydraulic fluid path from the second source 35 to the corresponding flow control valves. The orifice 37 provides a limited flow of hydraulic fluid from pump 35 to these two actuators during an antilock build mode. Since there is some interaction between the two wheels controlled by an orifice, some performance degradation may be expected. Two additional orifices may be added at a modest cost increase as shown in FIG. 2.

Figure 2:
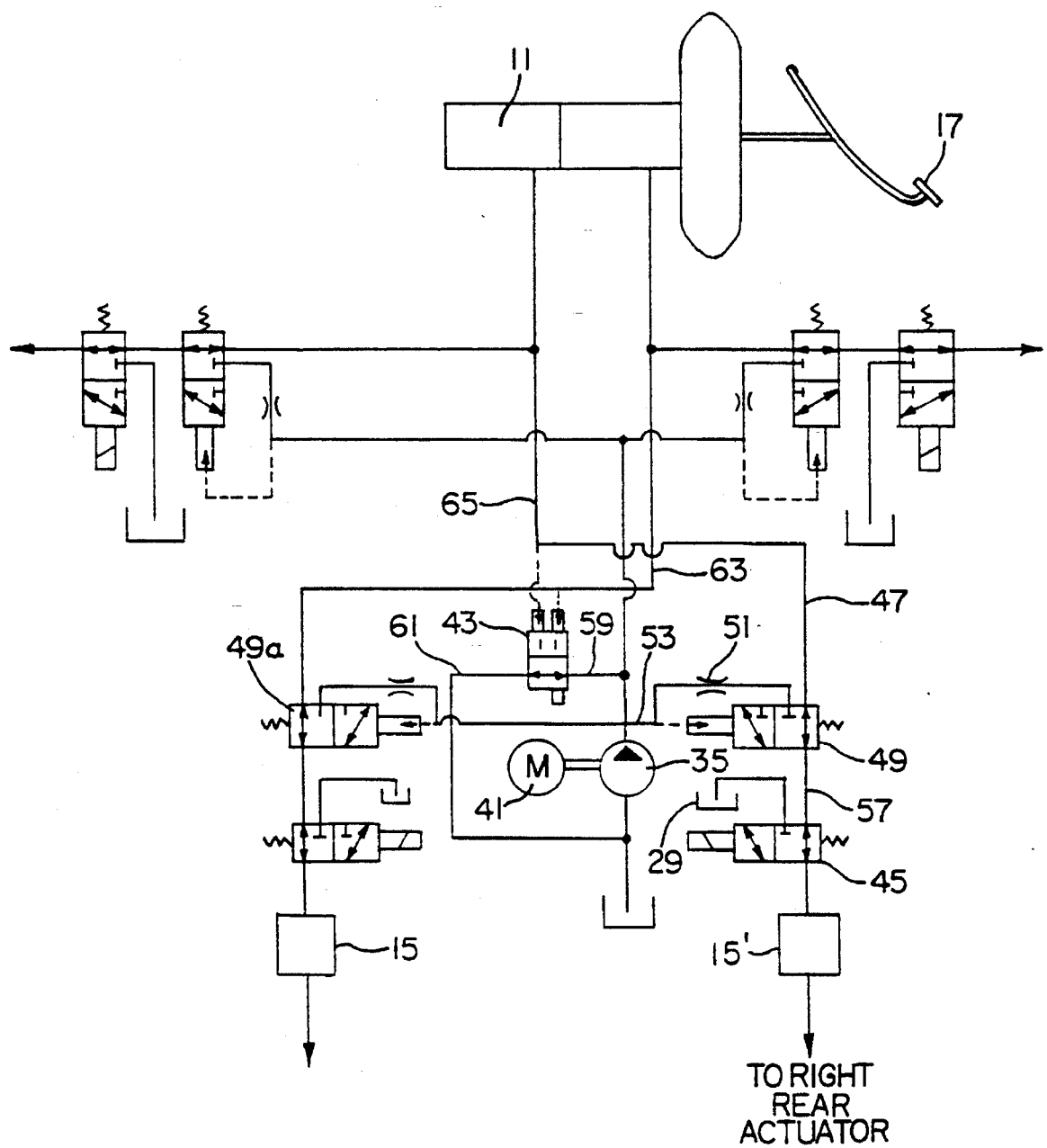
FIG. 2 is a schematic representation of an overall brake and anti-skid control system similar to FIG. 1, but illustrating the present invention in another form.

The antilock system of FIG. 2 differs from that of FIG. 1 by the addition of conduit 47, pressure actuated valve 49, orifice 51, and conduit 53 for the right rear actuator, and similar components for the left rear actuator. Like valves 21 and 23, valves 49 and 49a are hydraulic pressure actuated dual inlet, single outlet two position valves. Conduit 55 has been disconnected from the outlet of valve 21 in FIG. 1 and reconnected as conduit 57 to the outlet of a like, but distinct valve 49 in FIG. 2. Rebuild fluid now passes to the right rear actuator directly by way of restriction 51 and valves 49 and 45 rather than through the shared valve 21 and restriction 37 as before.

Figure 3:
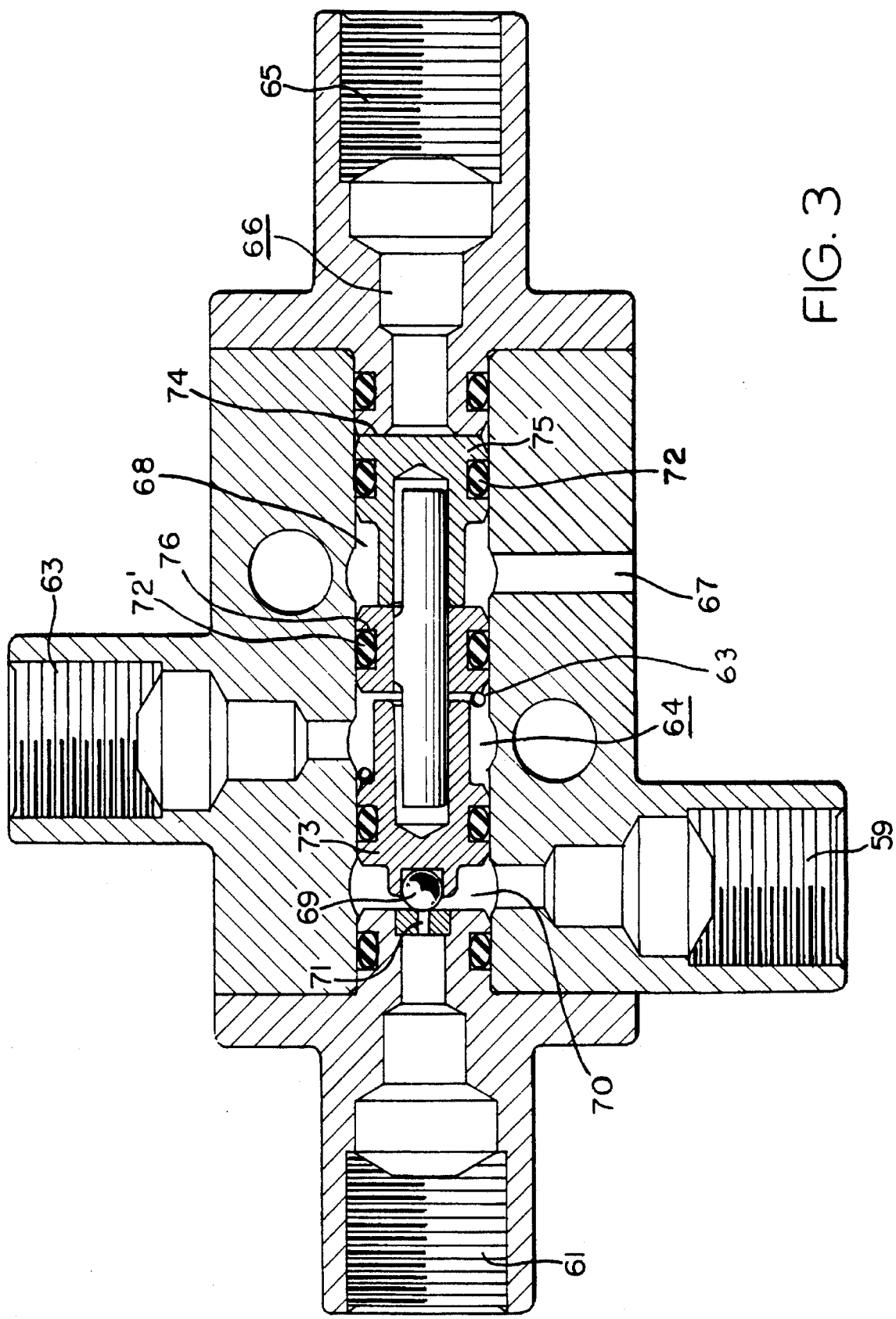
FIG. 3 is a cross-section view of a bypass regulator suitable for use in either FIG. 1 or FIG. 2.

Ports 59, 61, 63 and 65 in FIG. 3 are identified by like reference numerals on corresponding conduits in FIG. 2. Bypass pressure regulator 43 responds to pressurized fluid from either chamber 11 or 11a of the operator controlled master cylinder and the fluid pressure from the second source 35 to supply pressurized hydraulic fluid from the second source 35 to each of the pressure actuated valves 21, 23, 49 and 49a only when pressurized fluid from chamber 11 or chamber 11a of the operator controlled master cylinder is supplying hydraulic fluid pressure to one of the ports 63 or 65. Moreover, the pressure of the hydraulic fluid supplied from the second source 35 to each of the pressure actuated valves is directly proportional to the fluid pressure of chambers 11 and 11a of the operator controlled source master cylinder.

Since an operator controlled master cylinder source may have more than one chamber each of which selectively supply pressurized hydraulic fluid to a brake system, a pressure regulator in the brake system would have a corresponding number of control ports. The control ports in such a regulator would be arranged in such that pressure to the ports would provide proper function of the regulator despite failure of any of the individual system's circuits connected to the various chambers of the master cylinder. For example, when master cylinder pressure at port 63 presses on the valve, ball 69 closes on drain seat 71. The positive displacement pump 35 forces fluid into the chamber 70 between control piston 73 and the drain seat 71 and the pressure there between rises rapidly. When the pump pressure is slightly greater than the master cylinder pressure as presented to chamber 64, control piston 73 moves rightwardly after overcoming spring 63 as viewed in FIG. 3, allowing fluid to escape to the sump through port 61 to maintain the pressure at port 59 at the desired level. Should master cylinder portion 11a fail, pressure fluid from portion 11 of the master cylinder would be communicated to chamber 66 by way of port 65 to act on end 74 of piston 75. Piston 75 is connected to piston 73 by a bearing linkage 76 such that movement of piston 75 acts on piston 73 and opposes any force generated in chamber 70 by the pressurized fluid communicated from pump 35 to bring the system into a pressure balancing condition. Thus, the fluid as supplied to port 61 from chamber 70 is maintained at a level which never exceeds the fluid pressure supplied to operate vales 21 and 23 in conduits 19 and 20. In order to assure that the pressurized fluid carried in conduits 19 and 20 as presented to chamber 64 by way of port 63 and to chamber 66 by way of port 65 remains separated, a drain chamber 68 is located between piston 75 and bearing linkage 76. If either seal 72' or 72 should fail, fluid would be communicated through port 67 to provide a visual indication of such failure to an operator.

What is claimed is:

1. In a vehicle antilock braking system having a plurality of hydraulically actuated wheel rotation braking devices, each associated with one of a plurality of wheels, an operator controlled first source of pressurized hydraulic fluid including a master cylinder with first and second chambers for pressurizing said pressurized hydraulic fluid to developing a braking force which is selectively and simultaneously actuates each of the braking devices, a first flow control valve for selectively directing fluid from said first source of pressurized hydraulic fluid to each braking device to brake the vehicle and from the braking device to a storage sump to relieve braking force and means including a pump developed a second source of pressurized hydraulic fluid which is sequentially supplied through said first control valve to provide pressurized hydraulic fluid to the braking device for rebuilding said braking force after said first control has relieved said braking force by directing hydraulic fluid to said storage sump, the improvement comprising a bypass pressure regulator common to all the wheels having a housing with a bore therein having a first port connected to a first chamber of said master cylinder, a second port connected to said second chamber of said master cylinder, a third port connected to said pump and a fourth port connected to said storage sump, a first piston located in said bore for separating first port from said third and fourth ports, a second piston located in said bore for separating said first port from said second port, linkage for connecting said first piston with said second piston, a drain seat located in said third port, and a ball carried on said first piston, said first piston being responsive to said operator controlled first source of pressurized fluid received from said first chamber through said first port and said pump developed second source of pressurized hydraulic fluid as received through said fourth port for moving said first piston toward said third port to seat said ball on said drain seat as a function of the difference between the pressure of said first and second sources of pressurized hydraulic fluid such that said fourth port is connect to said third port to connect said pump to said storage sump when the pressure of said second source of pressurized hydraulic fluid is substantially equal to said first source of pressurized hydraulic fluid, and pressure actuated valve means responsive to said pump developed second source of pressurized hydraulic fluid for interrupting communication of said operator controlled first source of pressurized fluid to said first control valve by initiation communication of said pump developed second source of pressurized hydraulic fluid to said first control valve, said pressure actuated valve means having a restrictive orifice to limit the communication of said pump developed second source of pressurized hydraulic fluid to said braking devices to provide a smooth transition during said rebuilding of said braking force.

2. The improvement of claim 1 wherein said pressure actuated valve means has a first position wherein said operator controlled first source of pressurized hydraulic fluid is directly communicated to each braking device, and a second position wherein said first source of pressurized hydraulic fluid to said braking devices is blocked while a hydraulic fluid path is opened between said pump and braking devices.

3. The improvement of claim 2 wherein second piston in said bypass regulator is responsive to said operator controlled first source of pressurized fluid as received by said first and second ports to remain stationary when said first piston moves in response to said difference in pressure between said first source of pressurized hydraulic fluid and said second source of pressurized fluid.

4. The improvement of claim 3 wherein said second piston supplies said first piston with a force through said linkage when a difference occurs between pressurized hydraulic fluid developed in said first and second chambers of said master cylinder.

5. The improvement of claim 4 further comprising resilient means acting on and urging said first piston toward said drain seat to define a minimum difference between said first and second source of hydraulic fluid before said pump developed second source of hydraulic fluid, is communicated to said storage sump.

\* \* \* \* \*